United States Patent [19]

Candow

[11] Patent Number: 4,841,591
[45] Date of Patent: Jun. 27, 1989

[54] GOLF BAG CART WHEEL CLEANER

[76] Inventor: A. J. Candow, 2721 Riverbluff Ct., Villa 99, Sarasota, Fla. 34231

[21] Appl. No.: 286,377

[22] Filed: Dec. 16, 1988

[51] Int. Cl.$^4$ ............................ B60S 3/00; A46D 1/00
[52] U.S. Cl. ...................................... 15/160; 15/53 B; 280/DIG. 6
[58] Field of Search ........... 15/160, 53 B, 21 B–21 D; 280/DIG. 6

[56] References Cited

U.S. PATENT DOCUMENTS

| | | | |
|---|---|---|---|
| 1,909,869 | 5/1933 | Randrup | 15/53 B |
| 3,231,293 | 1/1966 | Ldustaunav | 15/160 X R |
| 4,233,703 | 11/1980 | Clyne et al. | 15/53 B |

FOREIGN PATENT DOCUMENTS 15194  5/1902  Sweden .

Primary Examiner—Peter Feldman
Attorney, Agent, or Firm—Charles J. Prescott

[57] ABSTRACT

A golf bag cart wheel cleaner for cleaning the wheels of a hand-operated golf bag cart. The invention includes a platform having an apertured generally horizontal upper surface which is structured to allow dirt and debris to pass downwardly therethrough. A pair of elongated horizontally disposed brushes are also included having downwardly pointing bristles spaced above the apertured surface a distance somewhat less than the diameter of golf bag cart wheels. Dirt and debris are dislodged from the wheels as the golf bag cart is manually moved along between the brushes atop the apertured surface. The brushes are preferably pivotally suspended to swing longitudinally while maintaining a generally horizontal orientation so as to accommodate various diameter wheels.

14 Claims, 2 Drawing Sheets

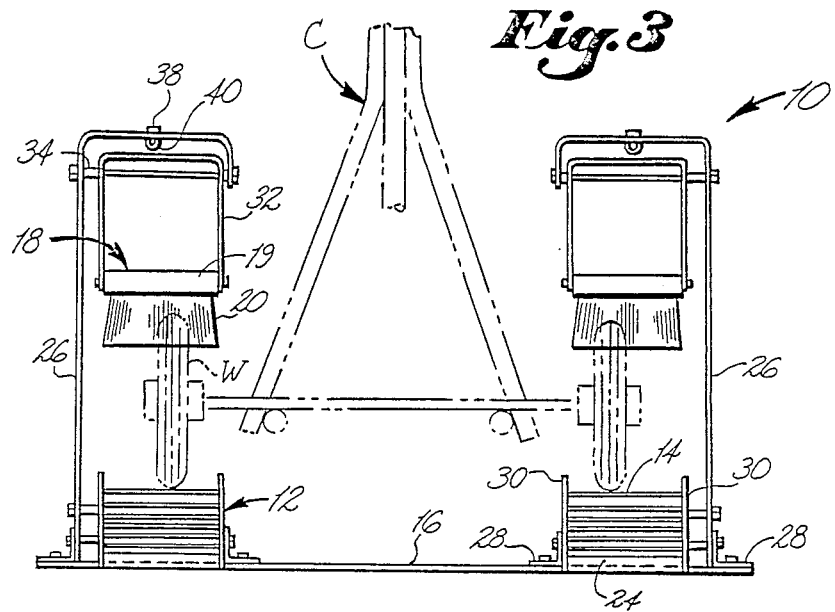
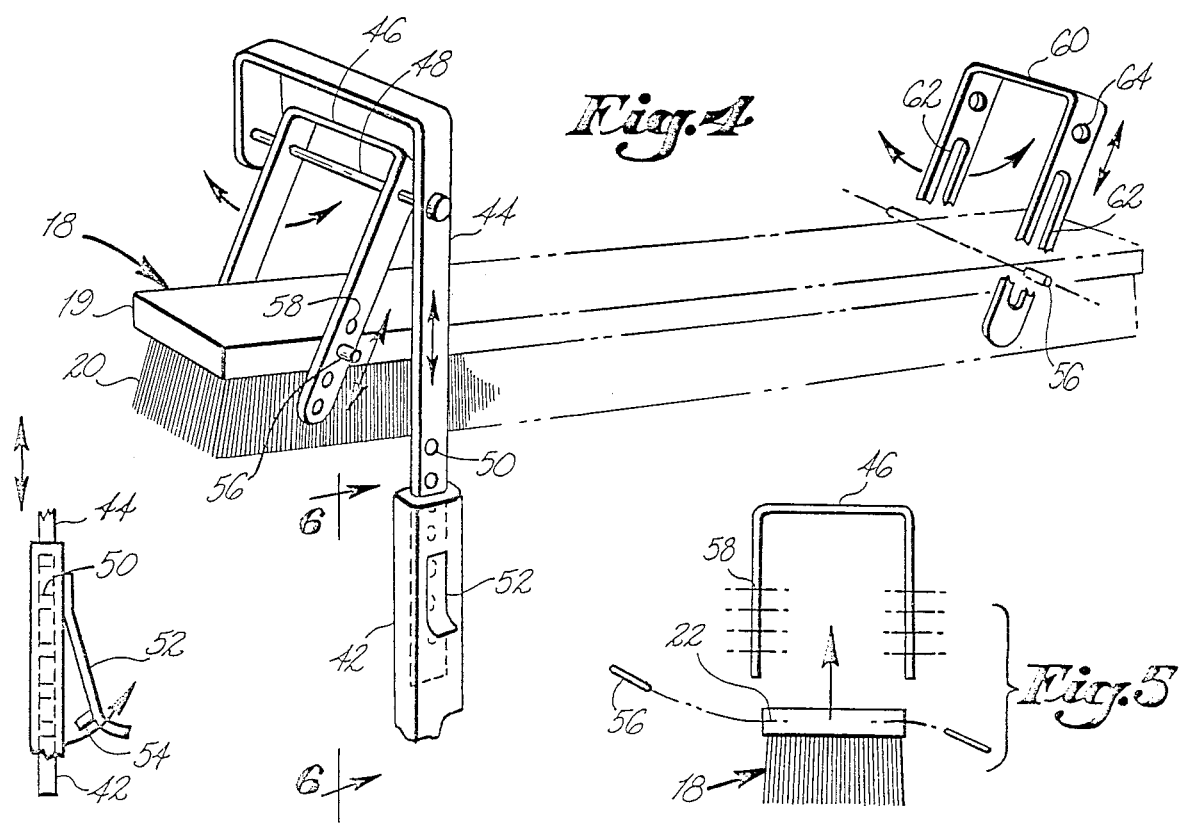

4,841,591

GOLF BAG CART WHEEL CLEANER

BACKGROUND OF THE INVENTION

This invention relates generally to golf bag carts, and more particularly to a golf bag cart cleaner for cleaning the wheels thereof.

Although motorized golf carts which carry both players and equipment are becoming more popular, a significant number of golf bag carts are still in use. These golf bag carts include a frame supported on two spaced wheels for receiving and retaining a golf bag and clubs and having a diagonally extending handle for pulling or pushing the bag cart.

Most golfers using bag carts keep the golf bag permanently affixed thereto and, because of their collapsibility, are able to carry the entire arrangement in the trunk of a car. At the end of play, typically the wheels of these bag carts have picked up debris, including loose grass, twigs, dirt, leaves and the like. If this debris is not removed from the wheels of the cart, a significant portion of that will be deposited into the trunk of the car.

Applicant is unaware of any device or arrangement other than hand brushes or a water supply from a hose to clean the bag cart wheels free of debris prior to placing the bag and bag cart into the trunk of the car.

The present invention provides simple and effective arrangement for allowing the golfer to simply pass his bag cart therealong just prior to departure which readily removes virtually all debris from the wheels of the bag cart. Easy positioning of the invention facilitates its location immediately adjacent a parking lot or valet.

BRIEF SUMMARY OF THE INVENTION

This invention is directed to a golf bag cart wheel cleaner for cleaning the wheels of a hand-operated golf bag cart. The invention includes a platform having an apertured, generally horizontal upper surface which is structured to allow dirt and debris to pass downwardly therethrough. A pair of elongated horizontally disposed brushes are also included having downwardly pointing bristles spaced above the apertured surface a distance somewhat less than the diameter of golf bag cart wheels. Dirt and debris are dislodged from the wheels as the golf bag cart is manually moved along between the brushes atop the apertured surface. The brushes are preferably pivotally suspended to swing longitudinally while maintaining a generally horizontal orientation so as to accommodate various diameter wheels.

It is therefore an object of this invention to provide a golf bag cart wheel cleaner which is readily useable at the end of golf play to remove debris from the wheels of golf bag carts.

It is another object of this invention to provide a simple, economical to manufacture, and conveniently positionable golf bag cart wheel cleaner for removing debris from the wheels of golf bag carts.

It is yet another object of this invention to provide a golf bag cart wheel cleaner which is adaptable to various size golf bag cart wheel spacing and diameters and is fully adjustable with minimal manual manipulation to accommodate widely divergent golf bag cart dimensions.

In accordance with these and other objects which will become apparent hereinafter, the instant invention will now be described with reference to the accompanying drawings in which:

BRIEF DESCRIPTION OF THE DRAWINGS

FIG. 3 is an end elevation view of the invention.

FIG. 4 is a perspective view of another embodiment of the frame and two alternate embodiments of the support brackets which interconnect between frame and brush.

FIG. 5 is a partial left end elevation view of FIG. 4.

FIG. 6 is a view in the direction of arrows 6—6 in FIG. 4.

DETAILED DESCRIPTION OF THE INVENTION

Figure 1:
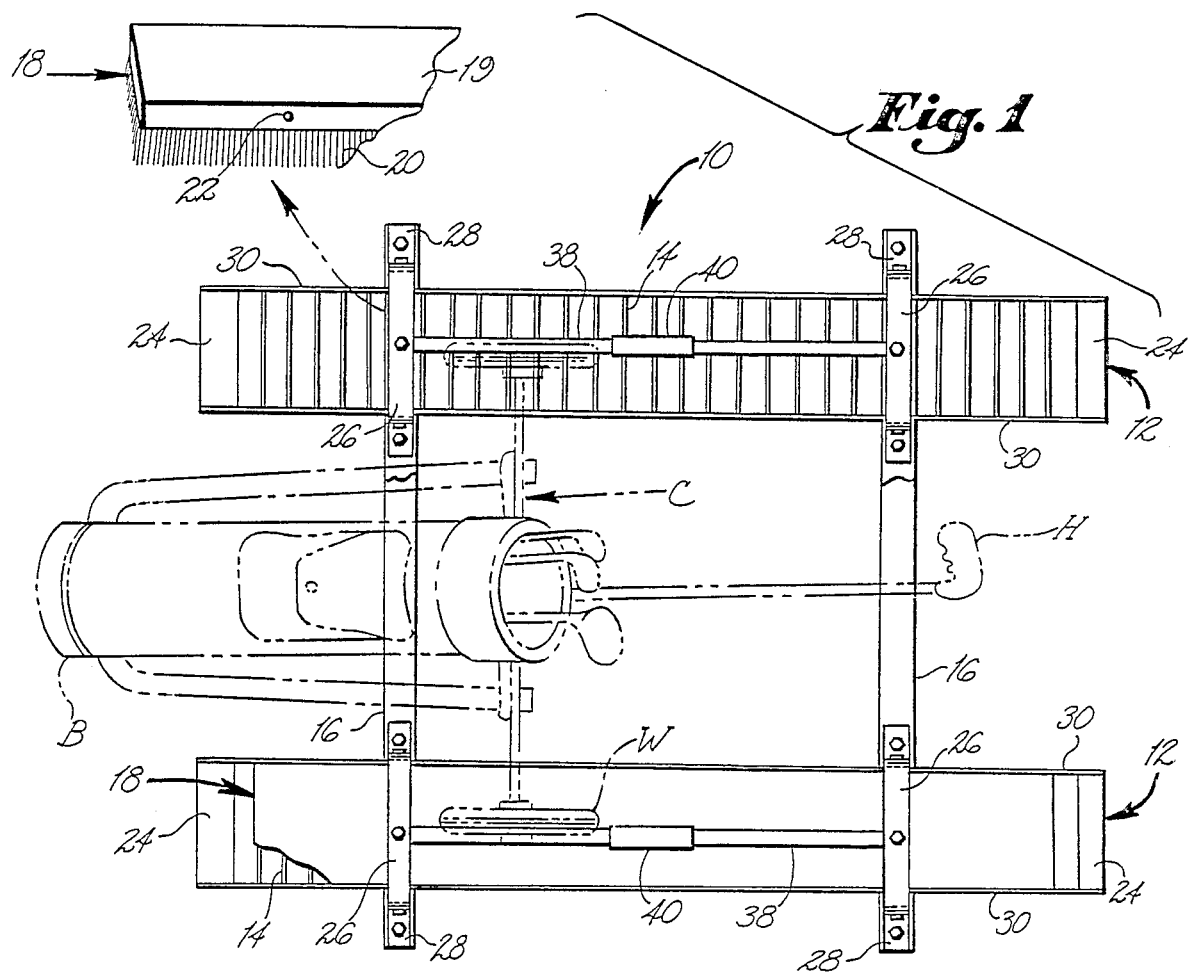
FIG. 1 is a top plan broken view of the preferred embodiment of the invention with one brush removed and partially shown in perspective adjacent thereto.
Figure 2:
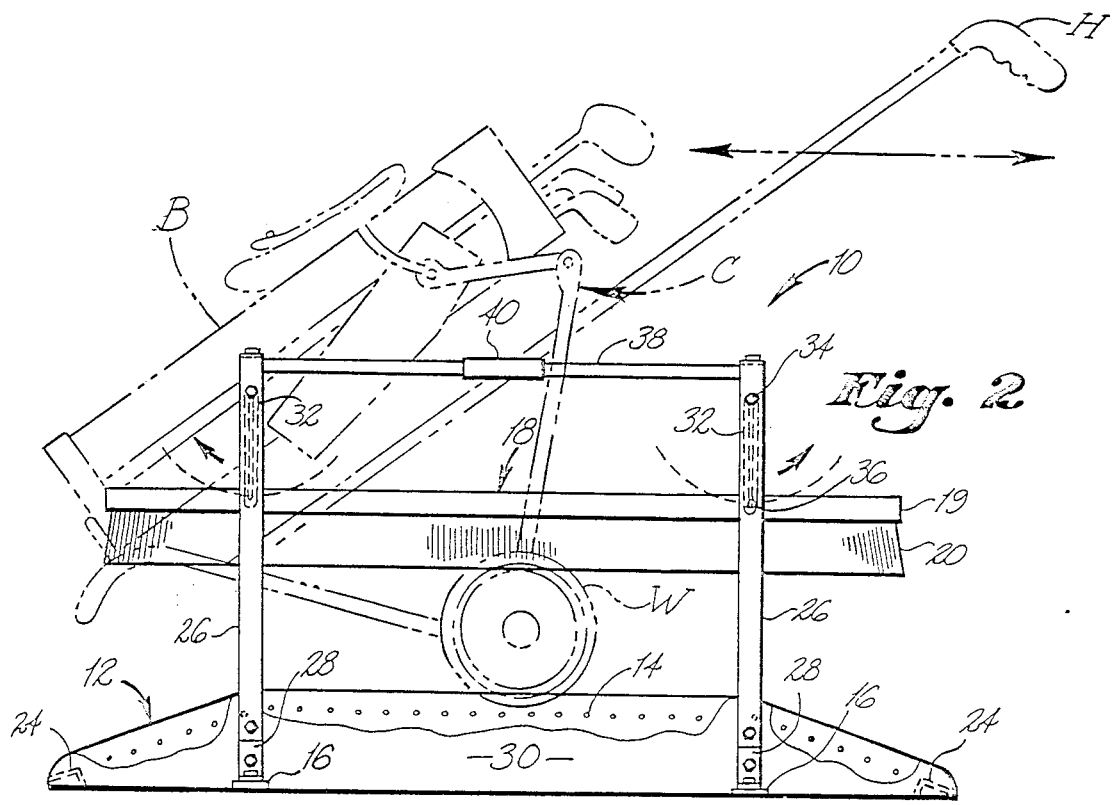
FIG. 2 is a broken side elevation view of the invention.

Referring now to the drawings, and particularly FIGS. 1 to 3, the preferred embodiment of the invention is shown generally at numeral 10 and includes two spaced apart elongated platforms 12 and two elongated brushes 18, each of which are generally supported over one platform 12 by frames 26.

Each platform 12 includes two spaced apart, upright panels 30 separated by a plurality of elongated, slender rigid rods 14 which are disposed in an array as best seen in FIG. 2 adjacent the upper margins of side panels 30. The spacing between each adjacent, transversely disposed rod 14 is such that debris such as leaves, grass clippings, dirt and the like will drop downwardly therethrough to be collected between the side panels 30.

The platforms 12 also are tapered downwardly toward their ends as shown and include a transversely disposed angle brace 24 at each end to form the initial surface of a ramp. Thereafter, the rods 14, following the tapered upper profile of side panels 30 continue sloping upward to the main horizontal portion of the platform 12.

Each brush 18 includes an elongated, rigid back support 19 having bristles 20 embedded therein in typical well-known fashion. The bristles 20 are downwardly disposed when each brush 18 is supported in intended fashion as best seen in FIGS. 2 and 3. Two U-shaped brackets 32 are spaced apart and pin connected to each brush 18 through transverse apertures 22 at their lower ends of the brackets 32. These U-shaped brackets 32 are pivotally connected at their upper ends along shaft 34 to frame 26 as best seen in FIG. 3. Each frame 26 is bolted to, and supported by, brackets 28 which serve to interconnect each frame 26 to the platforms 12 and to cross members 16. These cross members 16 serve to establish and maintain the generally parallel, spaced apart relationship between platforms 12 and may be made telescoping and adjustable in a well-known manner to accommodate extreme widths in the wheel base of golf bag carts.

Longitudinal braces 38 having handles 40 disposed centrally are provided for added strength to the adjacent upright frames 26 and also serve as a grasping means during use of the invention.

By this arrangement, then each brush 18 is pivotally supported on inverted U-brackets 32 as previously described such that each brush 18 may be swung back and forth while always maintaining a horizontal orientation above each platform 12 as best seen in FIG. 2.

A typical golf bag cart is shown in phantom generally at C which is adapted to supportively receive and retain a typical golf bag B thereon as shown. A handle H is provided for rolling the cart C along the ground upon a pair of wheels W which are spaced apart as shown. It should be clear from the above that, as a golf cart (shown in phantom) is rolled along the upper surfaces of platforms 12 atop the array of elongated rods 14, the wheels W are brushed clean of debris by bristles 20 and that the debris falling from the wheels W passes between and through the array of rods 14 so as not to recollect on the wheels W thereafter.

The height positioning of the brushes 18 is such that the lower surface of the bristles 20 is somewhat less in height above the array of rods 14 than the diameter of the golf bag cart wheels W to insure proper cleaning. However, if a larger wheel diameter is to be cleaned, the brushes 18 will swing longitudinally on brackets 32 as previously described so as to raise the brushes 18 and the bristles 20 to a position suitable to effect cleaning of these larger diameter wheels.

Referring now to FIGS. 4, 5 and 6, an alternate, fully adjustable embodiment of the frame and two support bracket arrangements are there shown. Brushes 18 are supported by pivotal interconnection to U-shaped bracket 46 by pins or bolts 56. These pins 56 are removable as best seen in FIG. 5 for easy and convenient repositioning through another hole 58 in bracket 46. As previously described, bracket 46 is pivotally connected by shaft 48 to upper frame member 44. However, in this embodiment, upper frame member 44 is made further vertically adjustable in the direction of the arrow by adjustable interconnection to lower frame member 42 as best seen in FIG. 6. A thin flexible clip 52, connected at its upper end to lower frame member 42 as shown, having pin 54 disposed on its inner surface. By flexing the clip 52 outwardly, upper frame member 44 may be then raised or lowered to be thereafter held by releasing clip 52 so that pin 54 enters into the appropriate selected aperture 50 in upper frame member 44.

Still referring to FIG. 4, an alternate and preferred embodiment of the height adjustability of the brush 18 is there shown at the right end of the brush 18. This embodiment includes support bracket 60 which is pivotally connected through apertures 64 on shaft 48 to frame 26 (see FIGS. 1–3). However, this support bracket 60 also includes slotted apertures 62 which slidably engage around pins 56 which are connected to the back support 19 as previously described with respect to FIG. 5.

Slotted apertures 62 on support brackets 60 thus allow the brush 18 on pins 56 to freely move up and down, held downwardly at the lower ends of slotted apertures 62 by gravity. However, when larger golf bag cart wheels W are passed beneath the brushes 18 and the previously described swinging motion of brushes 18 is insufficient to accommodate the larger wheel diameter, the brushes 18 may slidably move upwardly in self-adjusting fashion within slotted apertures 62.

Additionally, where the user inadvertently reverses the direction of movement of the golf bag cart C midway along the length of brushes 18, a binding or wedging effect would otherwise impede that reversal of motion. However, the slotted apertures 62 again freely allow the brushes 18 to move slidably upward on pins 56 without undue force required and without damage to the bristles 20.

Although the preferred structure for forming the upper surface of platforms 12 is as previously described, it should be noted that expanded sheet metal grading or any other apertured arrangement may be utilized and be within the intended scope of this invention. The only requirement is that this upper surface be sufficiently apertured to allow dirt, debris, leaves, grass clippings and the like to pass downwardly therethrough so as to prevent the debris dislodged by brushes 18 from thereafter recollecting on the wheels W as the golf bag cart C is rolled along the length of platforms 12 beneath brushes 18. Further, a single, continuous platform with such an upper surface may be positioned beneath both brushes.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A golf bag cart wheel cleaner for cleaning a hand-operated golf bag cart's wheels comprising:
    a pair of elongated, spaced apart platforms structured to be horizontally disposed atop the ground;
    each platform of said pair of platforms having an upper generally horizontal apertured surface extending along at least a portion of said platform structured to allow dirt and small debris to pass downwardly therethrough;
    an elongated brush held generally parallel to, and spaced above, each of said platforms by a frame connected therebetween; each said brush having downwardly pointed bristles spaced above the corresponding apertured surface a distance somewhat less than a golf bag cart wheel diameter;
    said pair of platforms and each said brush cooperatively structured and positioned to remove dirt and debris from the golf bag cart wheels as they are rolled along the apertured surfaces and beneath said bristles.

2. A golf bag cart wheel cleaner as set forth in claim 1, wherein:
    each said brush is pivotally connected to said frame by a pair of longitudinally spaced apart generally upright connecting links;
    each link of said pair of links pivotally connected at its upper end to said frame and at its lower end to one said brush such that each said brush may be freely swung longitudinally in arcuate fashion on said pair of links while being maintained in a generally horizontal orientation.

3. A golf bag cart wheel cleaner as set forth in claim 2, wherein:
    each said link of said pair of links is slotted along a portion of its length where pivotally connected to each said brush such that each said brush is self-adjusting in height above each said platform.

4. A golf bag cart wheel cleaner as set forth in claim 1, wherein:
    height of each said brush above the corresponding said apertured surface is adjustable.

5. A golf bag cart wheel cleaner as set forth in claim 4, wherein:
    lateral spacing between each said brush and between each said pair of platforms is adjustable.

6. A golf bag cart wheel cleaner as set forth in claim 1, wherein:

said apertured surface of each of said pair of platforms is formed by a plurality of slender rods spaced apart and connected to and between a pair of generally upright side panels.

7. A golf bag cart wheel cleaner as set forth in claim 1, wherein:
each of said pair of platforms is downwardly sloping toward each end of each said platform to form a ramped upper surface to receive the golf cart wheels.

8. A golf bag cart wheel cleaner for cleaning a hand-operated golf bag cart's wheels comprising:
an elongated platform structured to be horizontally disposed atop the ground and having an upper, generally horizontal apertured surface extending along at least a portion of said platform structured to allow dirt and debris to pass downwardly therethrough;
two elongated, spaced apart brushes each held generally parallel and spaced above said platform by a frame connected between said platform and each said brush; each said brush having downwardly pointing bristles spaced above said apertured surface a distance somewhat less than a golf bag cart wheel diameter;
said platform and each said brush cooperatively structured and positioned to remove dirt and debris from the golf bag cart wheels as they are rolled along, said apertured surface and beneath said brushes.

9. A golf bag cart wheel cleaner as set forth in claim 8, wherein:
each said brush is pivotally connected to said frame by a pair of generally upright longitudinally spaced apart connecting links;
each link of said pair of links pivotally connected at its upper end to said frame and at its lower end to one said brush such that each said brush may be freely swung longitudinally in arcuate fashion on each said pair of links while being maintained in a generally horizontal orientation.

10. A golf bag cart wheel cleaner as set forth in Claim 9, wherein:
each said link of said pair of links is slotted along a portion of its length where pivotally connected to each said brush such that each said brush is self-adjusting in height above said platform.

11. A golf bag cart wheel cleaner as set forth in claim 8, wherein:
height of each said brush is adjustable above said apertured surface.

12. A golf bag cart wheel cleaner as set forth in claim 11, wherein:
lateral spacing between each said brush is adjustable.

13. A golf bag cart wheel cleaner as set forth in claim 8, wherein:
said apertured surface is formed by a plurality of slender rods spaced apart and connected to and between a pair of generally upright side panels.

14. A golf bag cart wheel cleaner as set forth in claim 8, wherein:
said platform is downwardly sloping toward each end of said platform to form a ramped upper surface to receive the golf cart wheels.

* * * * *